3,360,305
DEAD MAN SEAT BRAKE USING SEPARATE HYDRAULIC ACTUATOR
Neil J. Ryskamp, Markham, Ill., assignor to Allis-Chalmers Manufacturing Company, Milwaukee, Wis.
Filed May 10, 1966, Ser. No. 548,957
4 Claims. (Cl. 303—19)

This invention relates to a braking mechanism for a vehicle and particularly to a safety braking system known generally as a dead man seat brake.

It is a general object of this invention to provide a dead man seat brake mechanism which is compatible with a vehicle braking system having automatic brake adjustment means.

It is a further object of this invention to provide a seat brake mechanism utilizing spring means to actuate the vehicle brakes and raise the operator's seat when unoccupied which can be readily applied to the existing vehicle braking system.

It is a further object of this invention to provide a seat brake mechanism utilizing a hydraulic actuator separate from the master cylinder of the regular vehicle braking system wherein the master cylinder serves as a reservoir to maintain the total system filled with fluid.

Figure 1:
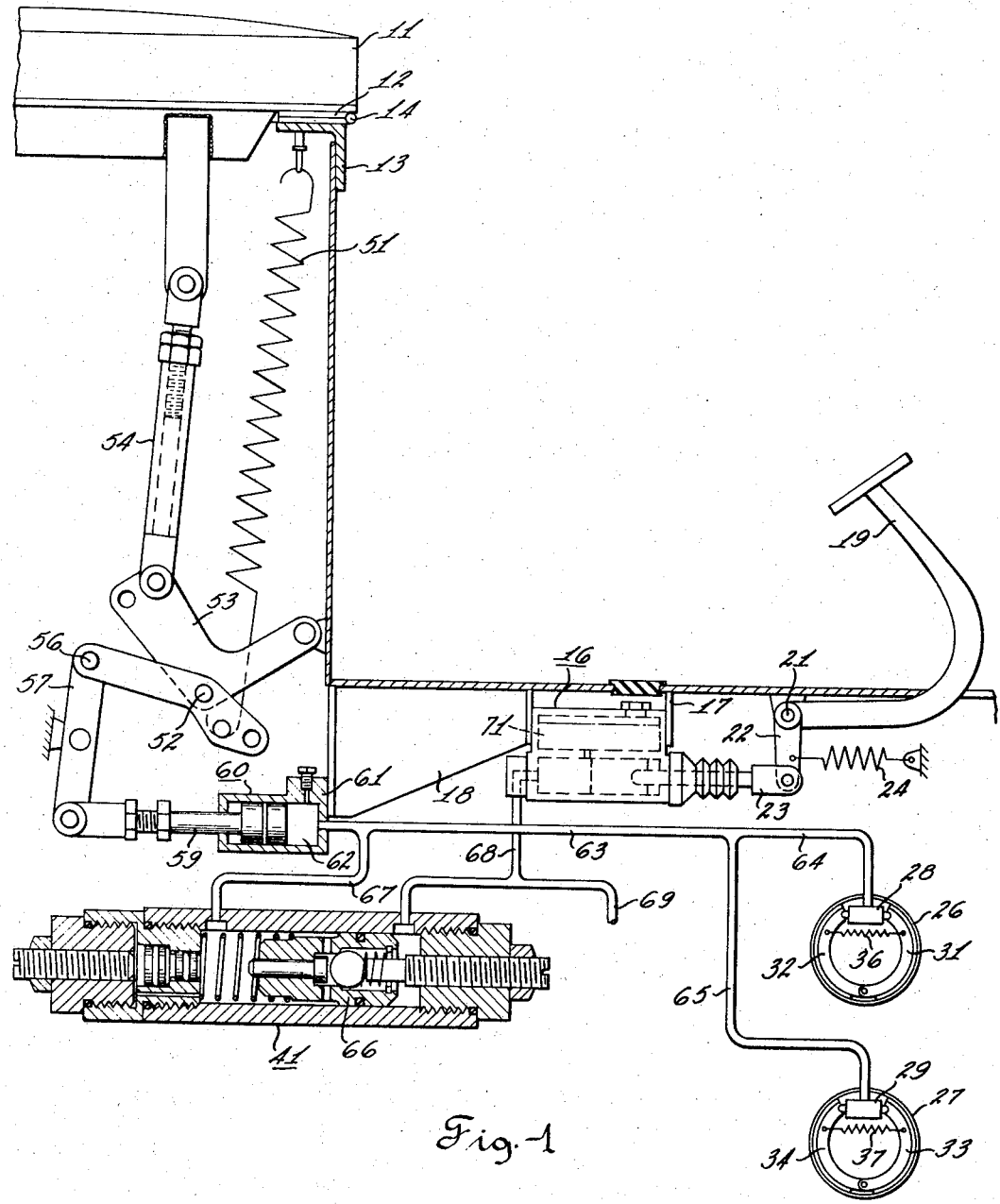
Figure 2:
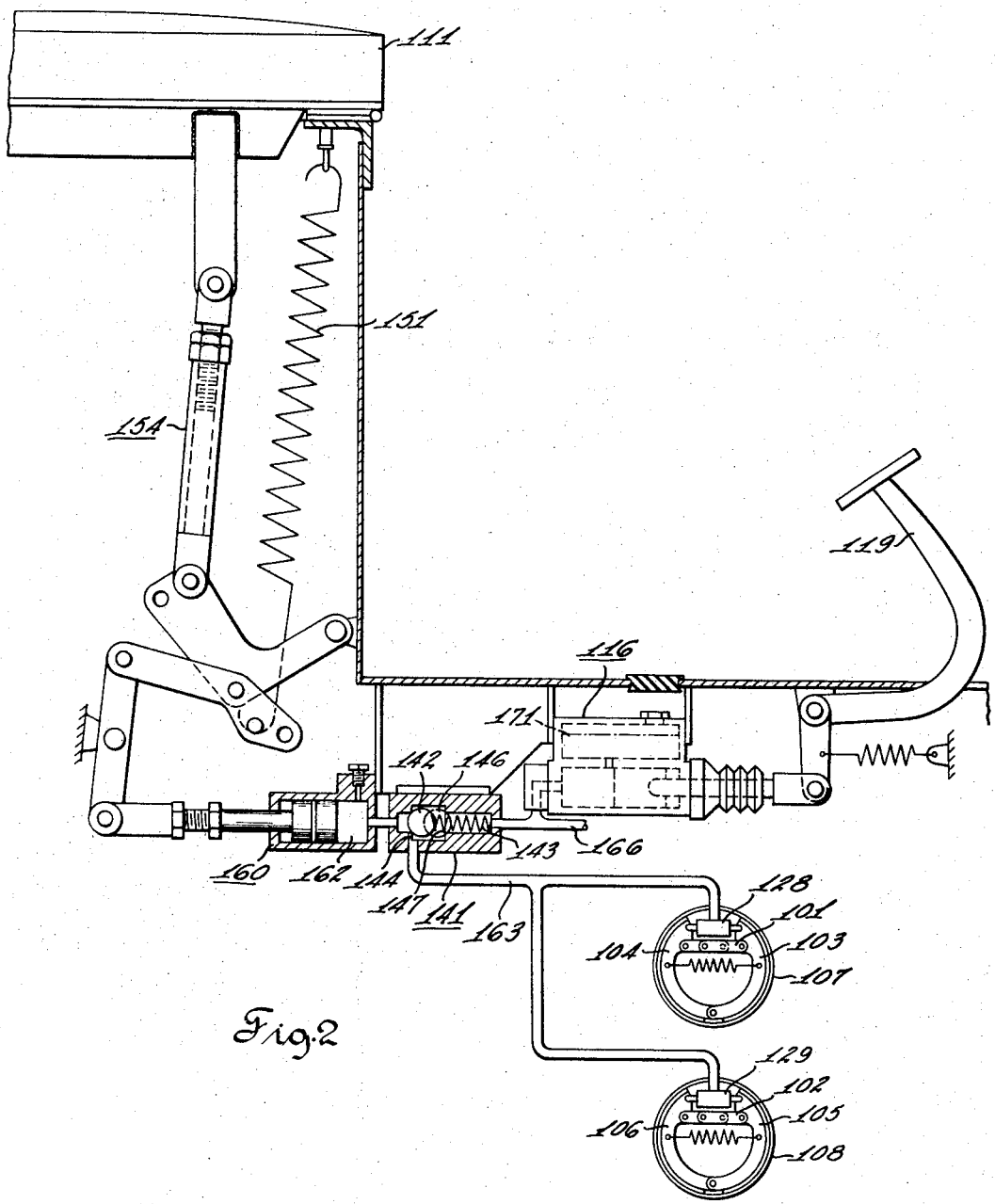

These and other objects and advantages of this invention will be apparent to those familiar with the art of vehicle braking when the following description is read in conjunction with the drawings in which:

FIG. 1 illustrates an embodiment of my invention in which an automatic, hydraulic brake adjuster is employed; and FIG. 2 illustrates a second embodiment of my invention in which automatic, mechanical brake adjusters are employed.

Referring to FIG. 1, the operator's station portion of the vehicle includes an operator's seat 11 pivotally connected by a hinge 12 to the vehicle chassis 13 for pivotal movement about a transverse axis 14. The braking system of the vehicle includes a conventional master cylinder 16 secured to the chassis 13 by brackets 17, 18. A brake pedal 19 is pivotally secured beneath the floorboard of the chassis 13 for pivotal movement about a transverse axis 21 and has a downwardly extending arm 22 pivotally connected to the master cylinder piston rod 23. A brake pedal return spring 24 is provided to return the brake pedal to its illustrated position. The illustrated braking system is intended for a four wheel vehicle having four wheel brakes although it may also be used in a vehicle having brakes on less than all the wheels. As illustrated the wheel brakes 26, 27 include hydraulic rams or wheel cylinders 28, 29, respectively, and brake shoes 31, 32 and 33, 34, respectively, with backoff springs 36, 37 to hold the brake shoes out of engagement when the wheel cylinders 28, 29 are not actuated by pressure fluid. The braking system illustrated in FIG. 1 also includes an automatic, hydraulic brake adjuster 41 which is fully described in my U.S. Patent No. 3,161,024. By use of the automatic, hydraulic brake adjuster 41 the amount of pressure fluid that needs to be supplied to wheel cylinders 28, 29 to effect braking is approximately the same throughout the wear life of the brake linings on the brake shoes 31, 32, 33, 34.

When the vehicle operator leaves the seat 11 a tension spring 51 will move the toggle pivot 52 upwardly thereby causing the seat to be moved upwardly about pivot axis 14 through action of bell crank 53 and link 54 interconnecting the bell crank 53 and seat 11. Pivot point 56 will move to the left as viewed in FIG. 1 when the seat 11 is pivoted upwardly and this moves lever 57 counterclockwise causing the piston element 59 of a hydraulic actuator 60 to be moved to the right relative to the cylinder component 61 of the actuator 60. Fluid is expelled from chamber 62, defined by the piston and cylinder components 59, 61, into brake line 63 connected to the wheel cylinders through its branches 64, 65. Check valve means 66 of the automatic, hydraulic brake adjuster 41 prevents brake fluid from flowing to the master cylinder 16 via brake line segments 67, 68. The branch conduit 69 extends to a pair of wheel brakes, not shown. Thus the seat brake mechanism operates only two of the four wheel brakes. A second automatic, hydraulic brake adjuster identical to that shown as reference character 41, in FIG. 1, may be advantageously utilized in the branch line 69.

If check valve means 66 was not provided the fluid exhausted from chamber 62 of actuator 60 would be pushed into the reservoir 71 of master cylinder 16. The actuator 60 does not interfere with the normal braking operation when the opeator is seated on the seat 11, thus forcing it to assume the position in which illustrated. Also, it should be noted that the reservoir 71 maintains the system full of fluid. Make-up fluid supplied by the metering mechanism of the automatic, hydraulic brake adjuster 41 serves to keep the actuator 60 as well as the brake lines and wheel cylinders full of fluid.

Referring to FIG. 2, mechanical automatic brake adjusters 101, 102 are connected to the shoes 103, 104, 105, 106 of wheel brakes 107, 108. These automatic, mechanical brake adjusters 101 and 102 are fully described in my U.S. Patent No. 3,195,689. Check valve means 141 is used to prevent flow of fluid to the master cylinder 116 when the hydraulic actuator 160 is actuated by upward movement of the seat 111. The linkage mechanism 154 is identical to that provided for seat 11 in FIG. 1. Also the spring 151 is installed in the manner that spring 51 of FIG. 1 is installed and is sufficiently strong to raise seat 111 and actuate the hydraulic actuator 160 to operate the wheel cylinders 128, 129 to effectively brake the vehicle when the operator leaves the operator's seat 111. The check valve means 141 includes a shiftable valve element in the form of a ball 142 which is lightly biased to its illustrated position by a weak spring 143. A recess 144 permits free flow fluid communication between the pressure chamber 162 of the hydraulic actuator 160 and the brake line 163 connected to the wheel cylinders 128, 129. When the hydraulic ram 160 is actuated by upward movement of the seat 111 under the influence of spring means 151, the fluid flow from chamber 162 will cause the ball 142 to move to the right to the position illustrated by dot-dash lines 146, thereby sealing against seat 147 and preventing flow of fluid back to the reservoir 171 of master cylinder 116. The check valve means 141 does not interfere with the normal braking operation in which brake pedal 119 is employed to effect braking. The reservoir 171 of the master cylinder 116 maintains the system filled with fluid, thereby insuring proper operation. Although two wheel brakes are illustrated it should be understood that other wheel brakes may be supplied through conduit 166.

The seat brake mechanisms of this invention may be advantageously used in material handling vehicles such as lift trucks. My system is relatively inexpensive, reliable and compatible with existing vehicle braking systems, thus permitting marketing as original equipment or as optional equipment suitable for installation by dealer organizations or users.

The embodiments of the invention for which an exclusive property or privilege is claimed are defined as follows:

1. A seat actuated braking system for a vehicle having hydraulic operated wheel brakes, comprising:
    a master cylinder,
    a brake pedal connected to said master cylinder,
    a brake line connecting the output of said master cylinder to said wheel brakes,
    a hydraulic actuator having relatively movable piston and cylinder components defining a fluid displacement chamber connected to said brake line,
    a vertically movable seat,
    linkage connecting said seat to one of said components and operable to actuate said actuator to expel fluid from said fluid chamber on upward movement of said seat, and
    check valve means in the portion of said brake line between said actuator and master cylinder preventing flow of fluid to said master cylinder when said hydraulic actuator is actuated by upward movement of said seat.

2. The system set forth in claim 1 wherein automatic brake adjuster means are provided for compensating for brake lining wear.

3. The system set forth in claim 2 wherein said automatic brake adjuster means is a mechanical type brake adjuster.

4. The system set forth in claim 2 wherein said automatic brake adjuster is a hydraulic type brake adjuster and includes said check valve means as part of its operating mechanism.

References Cited
UNITED STATES PATENTS

| | | | |
|---|---|---|---|
| 2,523,846 | 9/1950 | Russell | 303—19 |
| 3,259,203 | 7/1966 | Ryskamp | 188—109 XR |

MILTON BUCHLER, *Primary Examiner.*

J. McLAUGHLIN, *Assistant Examiner.*